(12) United States Patent
Saxena et al.

(10) Patent No.: US 7,970,777 B2
(45) Date of Patent: Jun. 28, 2011

(54) MODEL-DRIVEN DATABASE QUERY

(75) Inventors: Sanjay Saxena, San Jose, CA (US); Ritchard Shadian, San Mateo, CA (US); Srinivas Indla, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 495 days.

(21) Appl. No.: 11/970,941

(22) Filed: Jan. 8, 2008

(65) Prior Publication Data

US 2009/0177625 A1 Jul. 9, 2009

(51) Int. Cl.
*G06F 17/30* (2006.01)
*G06F 7/00* (2006.01)

(52) U.S. Cl. .......... 707/755; 707/708; 707/803

(58) Field of Classification Search .......... 707/4, 759
See application file for complete search history.

(56) References Cited

U.S. PATENT DOCUMENTS

| | | | |
|---|---|---|---|
| 2005/0102284 A1* | 5/2005 | Srinivasan et al. | 707/4 |
| 2007/0016558 A1* | 1/2007 | Bestgen et al. | 707/3 |
| 2007/0050379 A1 | 3/2007 | Day | |
| 2008/0059208 A1* | 3/2008 | Rockfeller et al. | 705/1 |

* cited by examiner

*Primary Examiner* — Kuen S Lu
(74) *Attorney, Agent, or Firm* — Squire, Sanders & Dempsey (US) LLP

(57) ABSTRACT

A system receives a model for a database to be queried and determines a first component-type and a first data-type for a first search criterion based on the model. The system generates at least one search criterion component that corresponds to the first search criterion and renders a query component that comprises the search criterion component.

18 Claims, 5 Drawing Sheets

MODEL-DRIVEN DATABASE QUERY

FIELD OF THE INVENTION

One embodiment is directed generally to a computer database, and in particular to the querying of data in a computer database.

BACKGROUND INFORMATION

Databases are used to store information for an innumerable number of applications, including various commercial, industrial, technical, scientific and educational applications. Databases are generally organized into tables and fields, and may be searched via database queries. A particular database may consist of many tables, and the tables in a database are generally related to each other.

Building easy to use and dynamic database user interfaces is one of the major challenges for any web application development project. The back-end implementation of business logic that supports any user interface needs to be very generic in order to efficiently manage large types of data, attributes, information and variations of the queries. In addition, the interface needs to be extensible and scalable as the application evolves over time. For any medium to large-scale web application, this is a daunting development task as several constraints come into play in designing such an implementation that meets the above requirements.

There are inherent problems with traditional approaches for implementing database query web interfaces. Traditionally, most web-based user interface forms are built one-by-one using a web page design tool, such as Microsoft FrontPage, Macromedia ColdFusion MX, or by manually writing Hypertext Markup Language ("HTML") code. This process is very time consuming and impractical for a rich user interface.

Further, a major issue in using traditional approaches for graphic user interface ("GUI") building and query writing is maintenance. As the application may evolve very quickly over time, the application needs to be constantly updated for new requirements. As the number of records in the database grows and the number of attributes available for querying grows, it becomes necessary to allow the user to perform complex trend analysis and finely control the set of attributes on which the queries operate. Traditional approaches do not provide this level of granularity without tremendous maintenance costs.

SUMMARY OF THE INVENTION

One embodiment is a system that receives a model for a database to be queried and determines a first component-type and a first data-type for a first search criterion based on the model. The system generates at least one search criterion component that corresponds to the first search criterion and renders a query component that comprises the search criterion component.

DETAILED DESCRIPTION

One embodiment is a system that generates web-based database query components that are model-driven and that allow an end user to dynamically add new query criteria. Therefore, changes to the model will not require changes to the query user interface, and the end user has control over the search criteria.

Figure 1:
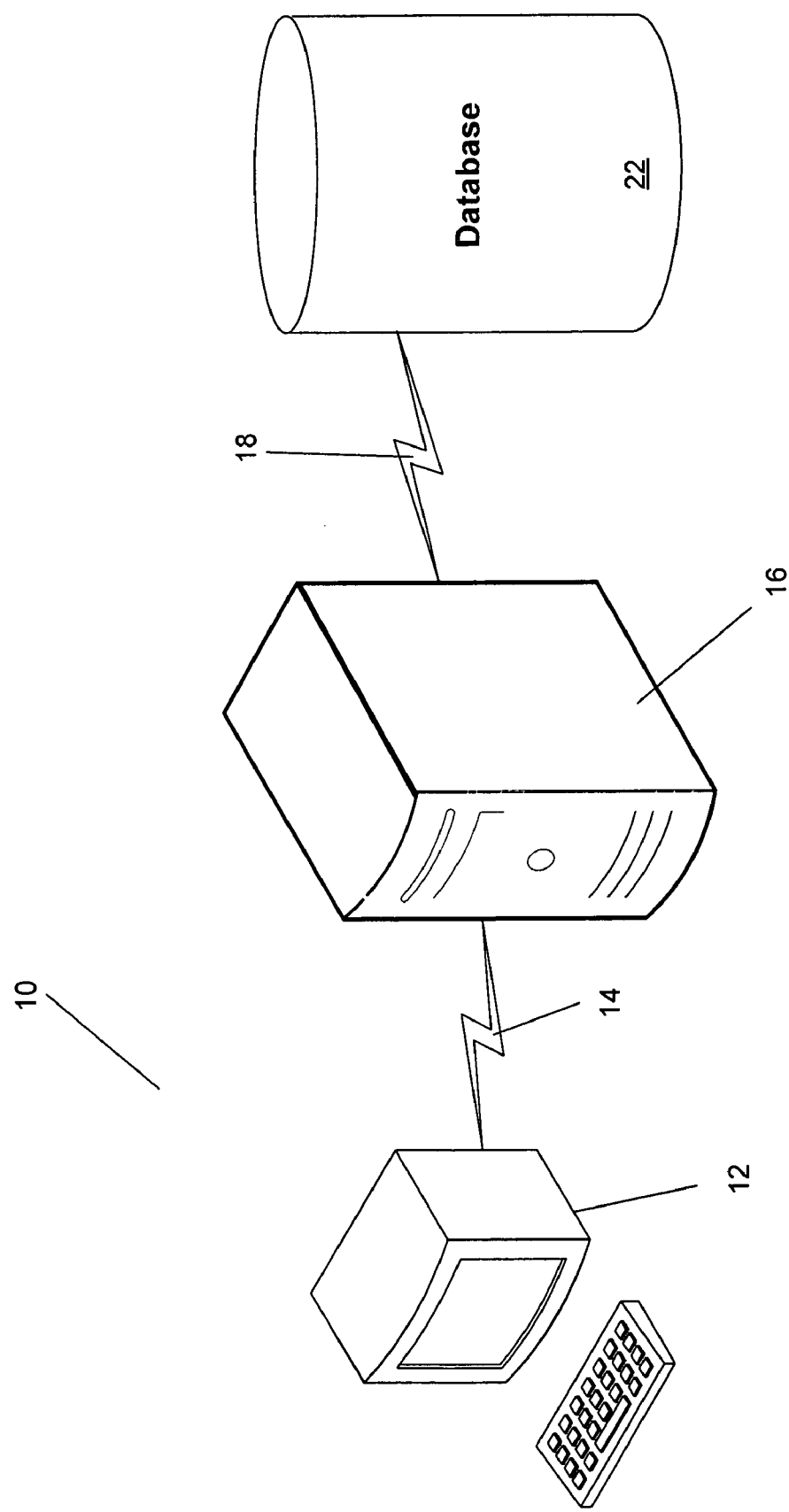
FIG. 1 is a block diagram of a system in accordance with one embodiment to provide model-driven database queries.

FIG. 1 is a block diagram of a system 10 in accordance with one embodiment to provide model-driven database queries. System 10 includes a client computer 12 that receives and displays a user interface ("UI") that includes one or more query components. Client computer 12 includes a processor and memory for storing instructions (not shown). The memory can be any type of memory or other computer readable media that stores instructions that are executed by the processor. Client 12 can be any type of computer or other computing device that can generate and display an Internet browser window or other type of graphical user interface ("GUI") or other type of UI, including a personal digital assistant ("PDA"), telephone, etc. In one embodiment, client 12 executes an operating system and an Internet browser.

Client 12 is coupled to a server computer 16 via a link 14. Link 14 is any type of local or network connection that enables client 12 to communicate and exchange data with server 16. In one embodiment, link 14 is the Internet. Server 16 includes a processor coupled to memory for storing instructions (not shown). The memory can be any type of memory or other computer readable media that stores instructions that are executed by the processor.

Server 16 is coupled, either locally or remotely, to a database 22 via a link 18. Database 22 can be any type of database that can be queried, including a relational or flat file database. A database, in general, is a collection of tables, each storing information on related fields or columns, each of which represents a particular attribute. A table could have one or more rows with each row containing values for the columns/attributes of the table. A query, in general, is a mechanism by which a user performs various operations on the database, such as retrieving information or updating data to the tables.

In one embodiment, system 10 has a model-view-controller ("MVC") architecture. In general, an MVC architecture in a computer application separates data (the "model") and user interface (the "view") concerns, so that changes to the user interface will not affect data handling, and the data can be reorganized without changing the user interface. An intermediate component, the "controller", decouples data access and business logic from data presentation and user interaction.

In one embodiment, the model is a domain-specific representation of the information that the application operates. Domain logic adds meaning to raw data, which in one embodiment is the data stored on database 22. The view renders the model into a form suitable for interaction, typically a user interface element or component. Multiple views can exist for a single model for different purposes. The controller processes and responds to events, typically user actions, and may invoke changes on the model.

In one embodiment, system 10 executes the Java Enterprise Edition ("Java EE") from Sun Microsystems, Inc. as an MVC framework. In this framework, the model is represented by entity beans, and the view is represented by a Java Server Page ("JSP"), which is implemented using JavaServer Faces ("JSF") components. A Java servlet functions as the controller. However, in other embodiments, any MVC framework may be used.

Figure 2:
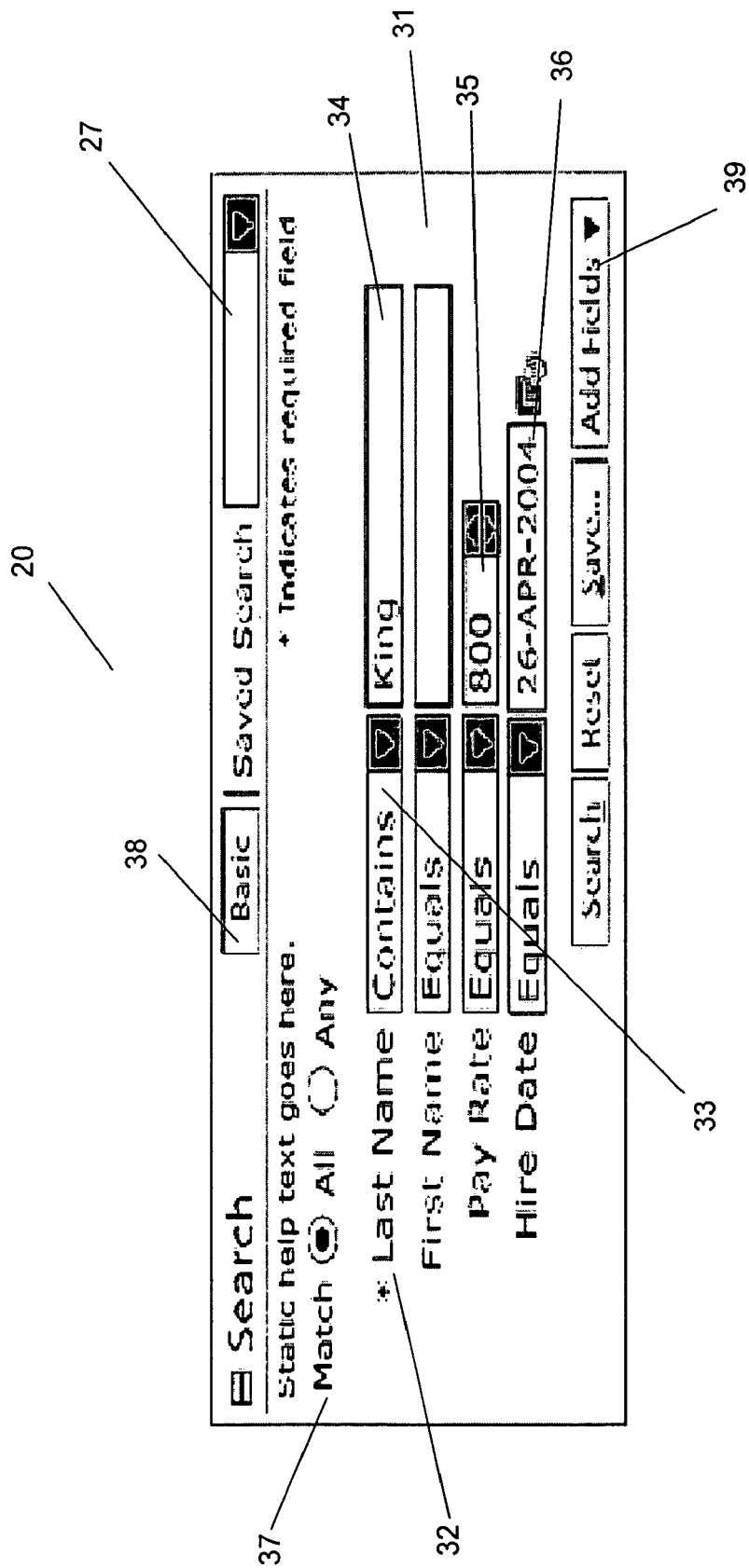
FIG. 2 is a block diagram of a query GUI component in accordance with one embodiment.

FIG. 2 is a block diagram of a query GUI component 20 in accordance with one embodiment. In one embodiment, component 20 is a JSF component that can be placed and displayed on a web page that is generated by server 16 and displayed on client 12 and that can be used to query data stored in database 22. The results of a query using component 20 may be displayed in a table or can be displayed in other output components.

Component 20 includes a criteria region 31 that includes multiple search criterion fields for searching and forming a database query and that enables a user to specify criteria for searching across multiple attributes of a single object. Component 20 receives a section of a query from each search field and connects them together to form a single complex query that gets passed to the component that displays the results. Each search field includes a prompt 32, a condition field 33 and a value field 34. In one embodiment, condition field 33 is a choice list in the form of a pull-down menu that contains a list of pre-defined options according to the data type of the search field. The value field may allow free form entry of the value, such as value field 34, or the value can be specified using other methods. For example, value field 35 includes a number "spin box" and value field 36 includes a "date picker". In one embodiment, each search criterion field is a component.

Query component 20 further includes a match type 37 which defines whether the search criteria should be treated as an AND search or an OR search. Query component 20 further includes a saved search field 27 which provides a pull-down menu of saved searches. When one of the saved searches is selected, the criteria are updated to match the saved search. Optionally, the current criteria can be saved as a new saved search. Query component 20 further includes a search mode toggle button 38 that allows the search component to be toggled between full query component 20 and a quick query component 50, disclosed below.

Figure 3:
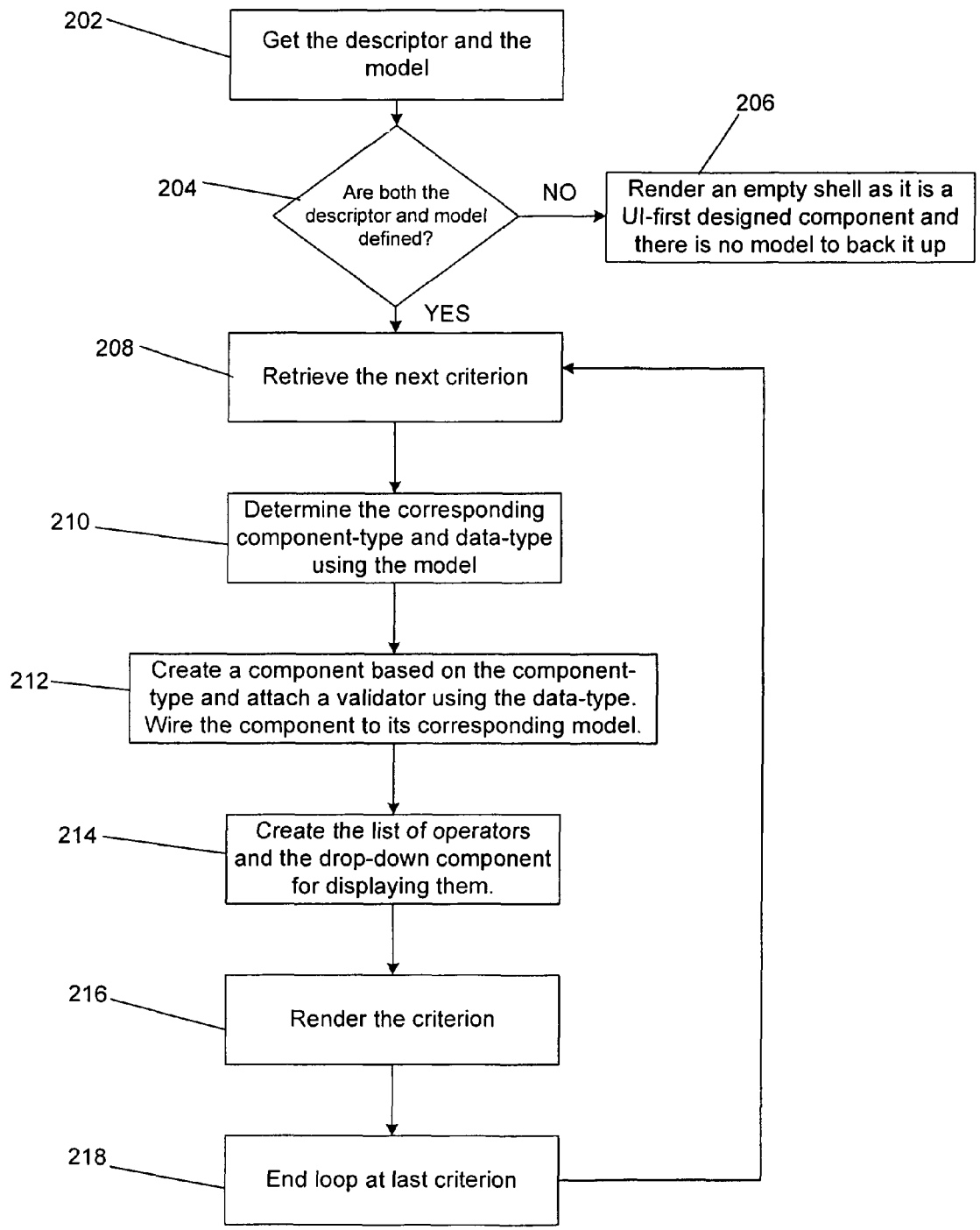
FIG. 3 is a flow diagram of the functionality of the system to generate the model-driven query component in accordance with one embodiment.

FIG. 3 is a flow diagram of the functionality of system 10 to generate model-driven query component 20 in accordance with one embodiment. In one embodiment, the functionality of the flow diagram of FIG. 3 is implemented by software stored in memory or other computer readable or tangible medium, and executed by a processor. In other embodiments, the functionality can be performed by hardware, or any combination of hardware and software.

At 202, after the initialization of query component 20, which includes setting up the layout, the toolbar, the footer, and saved searches, component 20 gets the query descriptor (or "QueryDescriptor") and model (or "QueryModel"). In general, the query descriptor contains a list of criterion objects that populate query component 20. Each criterion has information about the label/prompt, list of operators, component-type, data-type, corresponding model object, criterion value, etc. Using this information, component 20 can be dynamically created. Therefore, in one embodiment component 20 is completely model-driven.

At 204, it is determined if the descriptor and model are defined. If not, at 206 an empty shell is rendered because the component is a UI-first designed component since there is no model backing it up.

If the descriptor and model are determined to be defined at 204, at 208 the next criterion (or the first criterion if 208 has not yet been executed) is retrieved.

At 210, for the retrieved criterion, the corresponding type of component ("component-type") and the type of data ("data-type") are determined using the model.

At 212, a component is created based on the component-type, and a validator is attached using the data-type. In general, the validator is an object that checks the correctness of the value that the user has entered. For example, if for a "Department Number" field the user enters "ABC" instead of a numeric value, the validator catches it and informs the user to enter a correct numeric value. The component is then wired to its corresponding model. In one embodiment, the component is wired to the model using an intermediate binding object such as the JSF value binding expressions. The component retrieves the value from the intermediate binding and then pushes the value into the intermediate binding. This binding object can be any bean that is implemented on top of various model technologies.

At 214, the list of operators and the drop-down component for displaying them are created.

At 216, the criterion is rendered. The flow then returns to 208 as long as there are additional criteria. If not, the loop is ended at 218.

In one embodiment, the following tags are included in a JSP page and are used to create query component 20:

```
<af:query id="qid" headerText="Search"
    disclosed="true"
    resultComponentId="tableId"
    value="#{bindings.HighSalariedClerks.queryDescriptor}"
    model="#{bindings.HighSalariedClerks.queryModel}"
    queryListener="#{bindings.HighSalariedClerks.processQuery}"
queryOperationListener=
"#{bindings.HighSalariedClerks.processQueryOperation}"/>
```

In operation, when a page is requested, the JSP engine loads the page, walks down the page, and executes the tags. When the tag is executed, the corresponding component gets created. The above tag includes the following attributes that are used to generate query component 20:
  (1) "id"—used to uniquely identify the component in a page;
  (2) "headerText"—label that is shown in the header portion;
  (3) "resultComponentid"—Id of the component (typically a table) that shows the results once the query is executed;
  (4) "value"—specifies the QueryDescriptor that the component is referring to;
  (5) "model"—specifies the QueryModel that the component is referring to;
  (6) "queryListener"—specifies the listener/object that is notified when the query is to be executed. When the user clicks on the "Search" button, the listener is notified.

When the user specifies the conditions and criteria of the search and presses the "Search" button of component 20, the query is sent to the server 16 in one embodiment. The result set is returned to client 12 and displayed in another component, such as a table, according to the view parameters set by the end user.

Figure 4:
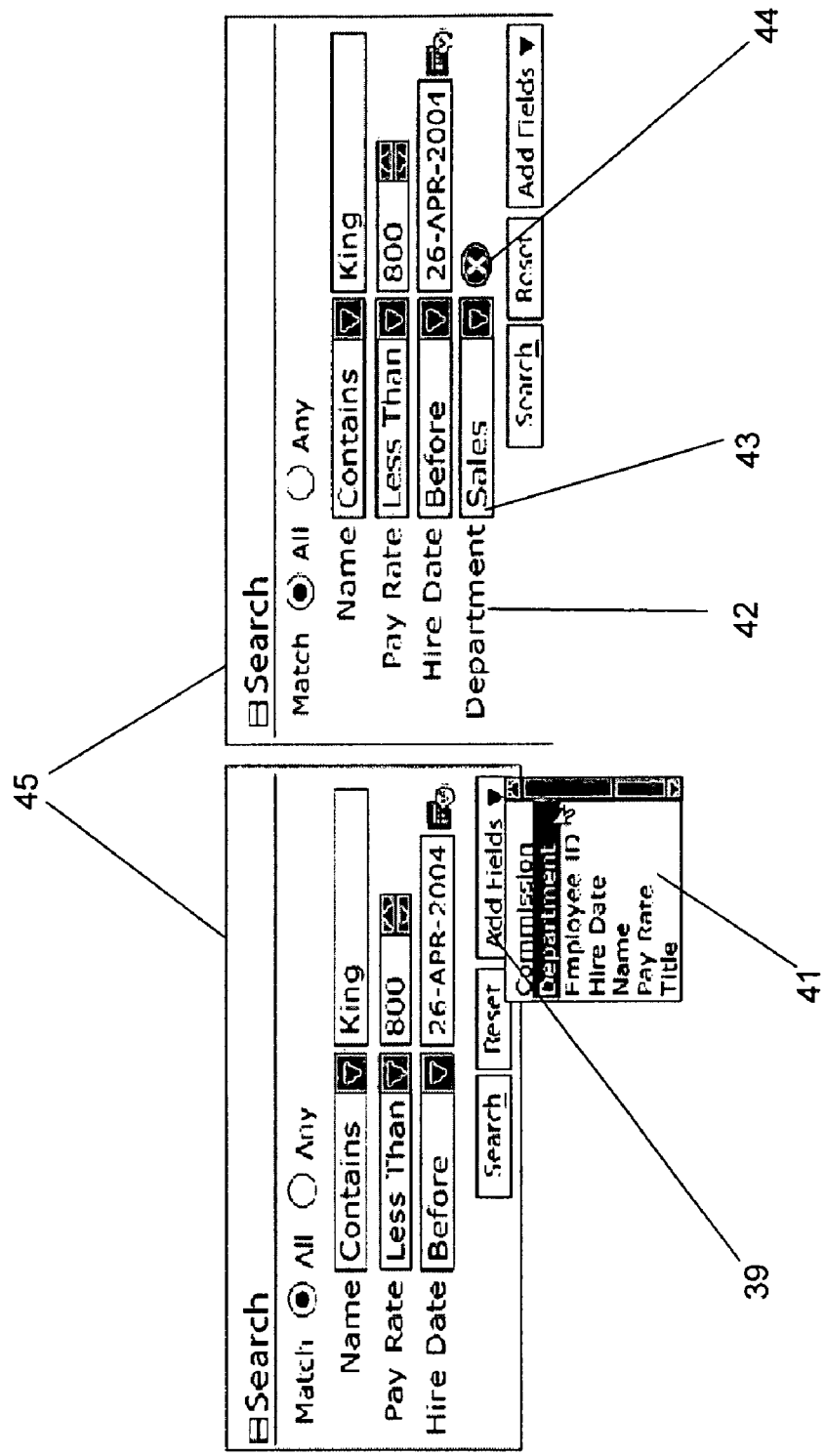
FIG. 4 is a block diagram of a GUI search component in accordance with one embodiment that illustrates the application of an add fields button.

Query component 20 further includes an "add fields" button 39. Add fields button 39 allows a user at client 12 to dynamically add additional search fields. FIG. 4 is a block diagram of a GUI search component 45 in accordance with one embodiment that illustrates the application of add fields button 39. When add fields button 39 is selected, a popup list 41 of searchable attributes is exposed. When the user selects one of these attributes (e.g., "department"), a dynamically generated search criterion input field 42 and dropdown value 43 appears. An operator field may also appear. The newly created search criterion also includes a delete icon 44. The user can subsequently click on this icon to delete the added field. The new search criterion is generated by determining the corresponding component-type and data-type of the criterion using the model.

Figure 5:
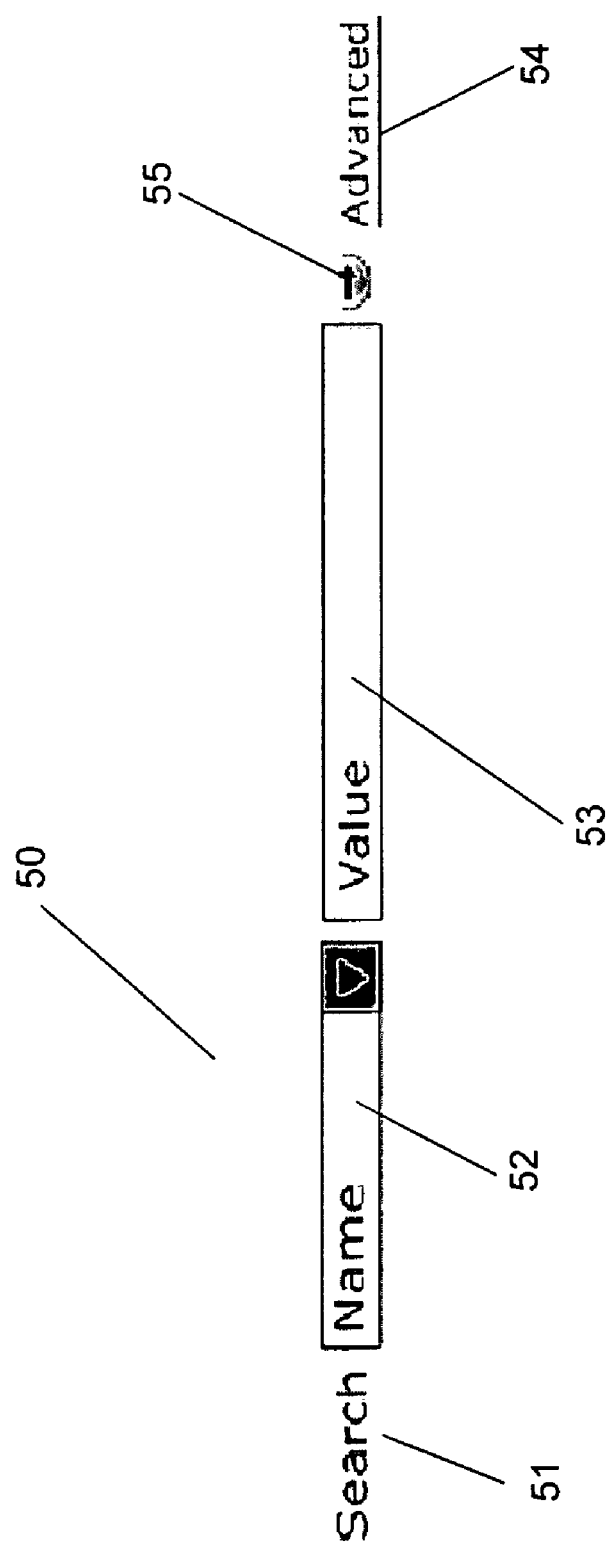
FIG. 5 is a block diagram of a quick query component in accordance with one embodiment.

As disclosed above, toggle button 38 of query component 20 generates a quick query component 50. FIG. 5 is a block diagram of quick query component 50 in accordance with one embodiment. Quick query component 50 allows a user to do a quick search by searching for a textual string across multiple attributes of a single object. Component 50 includes a prompt 51, an attribute field 52 and a value field 53. Attribute field 52 in one embodiment is a choice list that contains a list of common attributes (e.g., Employee ID, Last Name, etc.) for the object being searched. By default, the list may contain the entire set of searchable attributes defined in the data model. Value field 53 is similar to the value fields of FIG. 2. Advanced link 54 changes the component back to query component 20 of FIG. 2.

In one embodiment, the following tags in a JSP page are used to create quick query component 50:

```
<af:quickQuery id="qqid" searchDesc="Search"
    value="#{bindings.HighSalariedClerks.queryDescriptor}"
    queryListener="#{bindings.HighSalariedClerks.processQuery}"/>
```

For the above quick query tags, the "searchDesc" attribute is used to show a tooltip on a "Go" button 55 of quick query component 50.

As disclosed, the query components in accordance with embodiments of the present invention, including components 20 and 50 are model-driven, so that they adapt to the changes in the model without requiring changes to the component's definition. Therefore, if application developers need to revamp their model to, for example, include additional columns in their database tables, the application developers are shielded from making any changes to their web pages which include these components. By virtue of being model-driven, the components automatically adapt to the changes in the model/back-end.

Several embodiments are specifically illustrated and/or described herein. However, it will be appreciated that modifications and variations of are covered by the above teachings and within the purview of the appended claims without departing from the spirit and intended scope of the invention. For example, a computer readable medium may include electronic signals.

What is claimed is:

1. A computer readable medium having instructions stored thereon that, when executed by a processor, cause the processor to:
    receive a model for a database to be queried;
    determine, using the model, a first component-type and a first data-type for a first search criterion;
    generate, based on the first component-type, at least one search criterion component that corresponds to the first search criterion; and
    render a query component on a view, wherein the query component comprises the search criterion component;
    wherein the processor instructions, when executed, implement a model-view-controller framework, and the model is represented by entity beans, the view is represented by a Java Server Page, and the view is implemented using JavaServer Faces components.

2. The computer readable medium of claim 1, the instructions further causing the processor to:
    receive a request from a user via the query component for an additional search criterion;
    determine a second component-type and a second data-type for the additional search criterion based on the model;
    generate an additional search criterion component that corresponds to the additional search criterion; and
    add the additional search criterion component to the query component.

3. The computer readable medium of claim 2, wherein the query component comprises a button for adding a search criterion, and the request is generated in response to a selection of the button by the user.

4. The computer readable medium of claim 1, wherein the search criterion component comprises a condition field and a value field.

5. The computer readable medium of claim 1, the instructions further causing the processor to:
    receive a request from a user via the query component for a quick query component;
    render the quick query component that comprises an attribute field and a value field.

6. The computer readable medium of claim 5, wherein the quick query component is adapted to allow searching for a textual string across multiple attributes of a single object.

7. A method of querying a database, comprising:
    receiving a model for the database;
    determining, using the model, a first component-type and a first data-type for a first search criterion;
    generating, based on the first component-type, at least one search criterion component that corresponds to the first search criterion; and
    rendering a query component on a view, wherein the query component comprises the search criterion component;
    wherein the method implements a model-view-controller framework, and the model is represented by entity beans, the view is represented by a Java Server Page, and the view is implemented using JavaServer Faces components.

8. The method of claim 7, further comprising:
    receiving a request from a user via the query component for an additional search criterion;
    determining a second component-type and a second data-type for the additional search criterion based on the model;
    generating an additional search criterion component that corresponds to the additional search criterion; and
    adding the additional search criterion component to the query component.

9. The method of claim 8, wherein the query component comprises a button for adding a search criterion, and the request is generated in response to a selection of the button by the user.

10. The method of claim 7, further comprising:
    receiving a request from a user via the query component for a quick query component;
    rendering the quick query component that comprises an attribute field and a value field.

11. The method of claim 10, wherein the quick query component is adapted to allow searching for a textual string across multiple attributes of a single object.

12. The method of claim 7, wherein the search criterion component comprises a condition field and a value field.

13. A system comprising:
means for determining a first component-type and a first data-type for a search criterion using a model for a database to be queried, wherein the means for determining comprises a computer processor executing instructions;
means for generating, based on the first component-type, at least one search criterion component that corresponds to the first search criterion; and
means for rendering a query component on a view, wherein the query component comprises the search criterion component;
wherein the system implements a model-view-controller framework, and the model is represented by entity beans, the view is represented by a Java Server Page, and the view is implemented using JavaServer Faces components.

14. The system of claim 13, further comprising:
means for determining a second component-type and a second data-type for the additional search criterion based on the model after receiving a request from a user via the query component for an additional search criterion;
means for generating an additional search criterion component that corresponds to the additional search criterion; and
means for adding the additional search criterion component to the query component.

15. The system of claim 13, further comprising:
means for rendering a quick query component that comprises an attribute field and a value field after receiving a request from a user via the query component for the quick query component.

16. A computer readable medium having instructions stored thereon that, when executed by a processor, causes the processor to render a query component on a view, the query component comprising:
a criteria region that comprises a plurality of search criterion fields, wherein an input in each search criterion field provides a portion of a query of a database;
a model of the database; and
an add fields button that when selected causes an additional search criterion field to be added to the query component;
wherein the query component is implemented within a model-view-controller framework, and the model is represented by entity beans, the view is represented by a Java Server Page, and the view is implemented using JavaServer Faces components;
wherein the query component is generated by determining, using the model, a first component-type and a first data-type for a first search criterion and generating, based on the first component-type, at least one search criterion component that corresponds to the first search criterion.

17. The computer readable medium of claim 16, further comprising:
a toggle button that when selected causes a quick query component to be rendered.

18. The computer readable medium of claim 16, wherein the query component is rendered based on a tag on a Java Server Page.

* * * * *

UNITED STATES PATENT AND TRADEMARK OFFICE
CERTIFICATE OF CORRECTION

| | | |
|---|---|---|
| PATENT NO. | : 7,970,777 B2 | Page 1 of 1 |
| APPLICATION NO. | : 11/970941 | |
| DATED | : June 28, 2011 | |
| INVENTOR(S) | : Saxena et al. | |

It is certified that error appears in the above-identified patent and that said Letters Patent is hereby corrected as shown below:

In column 4, line 45, delete ""resultComponentid"" and insert -- "resultComponentId" --, therefor.

Signed and Sealed this
First Day of November, 2011

David J. Kappos
*Director of the United States Patent and Trademark Office*